Patented Dec. 15, 1953

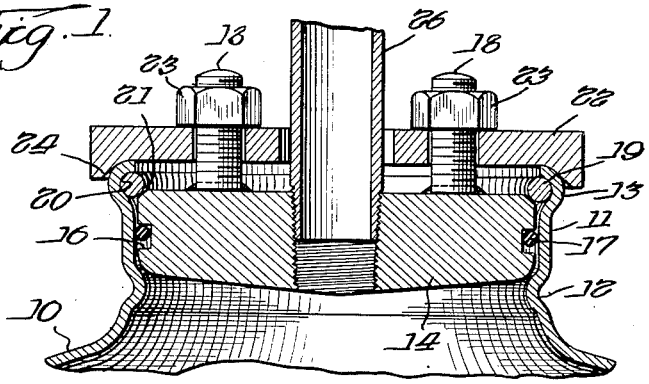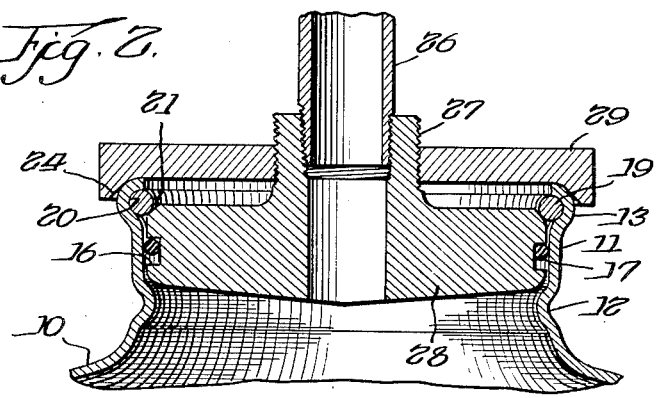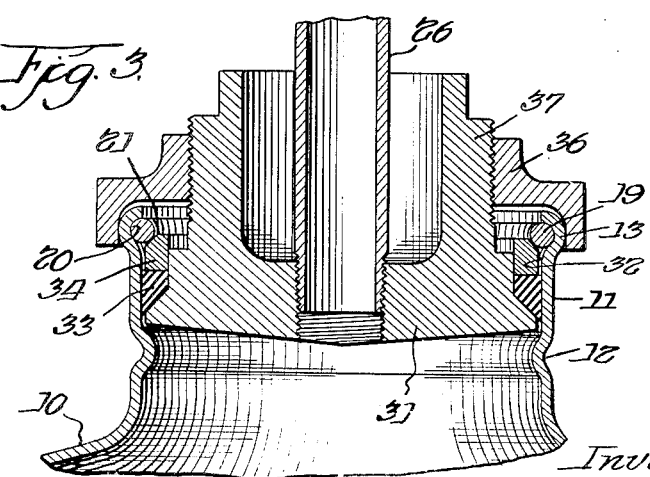

2,662,663

UNITED STATES PATENT OFFICE 2,662,663

CLOSURE FOR PRESSURE VESSELS

Edward G. Schmidt, La Grange, and Francis J. Cantalupo, Chicago, Ill., assignors to Crane Co., Chicago, Ill., a corporation of Illinois Application August 11, 1950, Serial No. 178,944

2 Claims. (Cl. 220—25)

This invention pertains to closures for pressure vessels or the like. More especially, it is concerned with a pressure actuated type, whereby the fluid seal is effected by a suitable mechanism employing a simple retaining member and sealing medium.

Normally enclosed vessels may frequently require accessible interiors for various reasons, such as the operations of glass lining, inspection, repairs, and the like. Therefore, the vessel has an opening therein for such purpose.

However, the opening in the vessel presents a problem of pressure sealing with a closure to form a complete pressure tight vessel, and it is the solution to this problem with which the present invention is particularly concerned.

Thus, it is an important object of this invention to provide a structure adaptable for use on pressure vessels to tightly seal an access opening within the vessel.

Another object is to provide a structure for fluid sealing an opening in a pressure vessel, said structure being simple and economical in construction and having substantial strength for operation.

Still other objects are to provide a pressure vessel closure which is not only inexpensive to manufacture, but requires relatively few machining operations and is easy to assemble.

Other objects and advantages will become more readily apparent upon proceeding with the following description read in light of the accompanying drawings, in which Fig. 1 is a fragmentary sectional view showing a preferred embodiment of this invention.

Fig. 2 is a fragmentary sectional view showing a modification of this invention.

Fig. 3 is a fragmentary sectional view showing a further modification of this invention.

Similar reference numerals refer to similar parts throughout the several views.

In describing a preferred application of this invention, it is convenient to refer to a pressure vessel 10 having an opening therein. The general shape of such vessel may, of course, vary, but a cylindrical shank 11 extending therefrom forms the vessel opening and, preferably, uses the formation shown in Figs. 1, 2, and 3. Perforating and rolling or spinning operations may be employed in forming the said shank to desired dimensions which will eliminate the need for machining. The shank 11 contains an annular reduced diametral portion 12 which prevents the entrance of the closure member into the vessel. An outer annular upper portion 13 of the shank is enlarged to form a support as hereinafter described. Generally, the shank 11 thus formed has been found to be preferable, but obviously, there may be several modifications in the design, such as by the elimination of the portion 12, for example.

As shown in Fig. 1, a circular closure member or a cover plate 14, having an annular groove 16 in the edge thereof, is mounted within the opening of the shank 11 above the reduced diametral portion 12. An O-ring 17, preferably of continuous circumferential form, is disposed relatively loosely within the groove 16 to effect a fluid tight seal between the inner annular surface of the shank 11 and the periphery of the plate 14. A plurality of annularly spaced studs 18 may be welded to the outer surface of the plate 14 for reasons hereinafter described.

Located within the shank enlarged portion 13 is a split ring 19 which maintains itself in such position by virtue of its tendency to expand. An upper annular edge 21 of the plate 14 is preferably beveled at forty-five degrees to abut the split ring 19, which thus secures the plate within the shank 11. It should be clear that the angle of plate edge 21 need not be any specific degree of bevel, however, it is known that the forty-five degree bevel produces for most purposes the best bearing relation between the plate 14 and the split ring 19, preferably snugly received within the groove 20.

A retaining ring 22 is positioned over the end of shank 11 and contains the usual apertures, as shown, to receive the studs 18 onto which stud nuts 23 are threaded to secure the entire assembly. Thus, the plate 14 is drawn against the split ring 19 by means of the studs 18 and nuts 23, acting on the retaining ring 22 to force the latter member against the outer edge of the shank 11. A beveled edge 24 may be formed in the ring 22 and thereby exert a force inwardly on the shank 11 as the nuts are tightened to provide support for the outer portion of the shank 11 against the internal force exerted on the shank through the split ring 19. By providing the same angle of bevel on the annular edge 24, as that described in connection with plate edge 21, a substantial support for the shank 11 may be obtained.

Preferably, a pipe 26 may communicate with the interior of the vessel 10 by extending through an opening in the ring 22 and a threaded portion in the plate 14. If desired, there may, of course, be a plurality of pipes extending therewithin, or the pipes may be located on the vessel 10 elsewhere than shown.

Referring to the modification shown in Fig. 2, a cover plate 28 is provided and eliminates the plate studs 18 by substituting therefor a threaded centrally projecting cover plate shank 27 to which a retaining ring 29 is secured by threads, as illustrated. Thus, the assembly is secured to the vessel shank 11 with the remainder of the structure being substantially the same as that described in connection with Fig. 1.

A further modification of this invention is shown in Fig. 3. In this arrangement, a cover plate 31 is disposed within the shank 11, and is provided with the reduced outer annular portion which forms a chamber 32 with the shank 11. A seal ring 33 is located within the chamber 32 and is secured therewithin by means of the back-up ring 34, positioned adjacent to the seal ring. The split ring 19, being disposed in the shank portion 13, abuts the ring 34 to secure the same within the shank 11 in the manner described in the preceding figures. The ring 34 is further supported by making an internal peripheral contact against the cover plate 31. A retaining nut 36 is threadedly mounted onto an externally threaded shank 37 of the cover plate 31, thereby to secure the entire assembly by abutting the shank 11 and being formed to support the same against flaring outwardly.

It will be apparent that while this application for Letters Patent has been described in specific forms, it is susceptible to numerous changes, and should, therefore, be limited only by the spirit of the invention and the scope of the appended claims.

We claim:

1. A vessel closure structure comprising in combination a pressure vessel, a shank portion projecting outward from said vessel and forming an opening therein, the shank having a slightly reduced portion on the inner periphery thereof and a slightly enlarged annular grooved deformable portion on the outer end thereof, a closure plate member disposed intermediate said shank end portions and having a peripheral groove on an outer edge thereof, a fluid sealing ring disposed within said groove, a split ring secured within the grooved portion of said shank outer end enlarged portion, the said closure plate member having threaded projecting means thereon, the said split ring being of a lesser diameter than said plate member and overlying the latter member to limit its upward and outward movement relative to the pressure vessel, a retaining ring threadedly engaging the said closure plate projecting means to abut said vessel shank and to enclose an end of the deformable portion thereof beyond the threaded projecting means of the said closure plate, the said retaining ring having an inner annular frusto-conical surface for engagement by the enclosed end of the said vessel shank portion.

2. A vessel closure structure comprising in combination a pressure vessel, an annular shank extending outwardly from said vessel to form an opening therein, the said shank having a slightly reduced annular portion on the inner end thereof and a slightly enlarged grooved deformable portion on the outer end thereof, a closure cover plate member receivable past the grooved portion and positioned intermediate said shank end portions to form an outer annular chamber therebetween, a fluid seal ring disposed within said annular chamber, means for retaining said seal ring within said chamber, a split ring disposed within a grooved portion of the said shank enlarged portion, said split ring overlying an outer peripheral portion of said cover plate member, threaded means integral with said closure plate, and retaining means engaging said threaded means to bear on an outer part of the annular deformable portion of said vessel shank end and enclose the latter portion to retain it against substantial outward expansion while under the influence of internal fluid pressures within the vessel, the enclosed end of the said vessel shank portion being annularly rounded on its side and upper end, the said retaining means having an inner annular frusto-conical surface for engagement by the said annularly rounded surface of the shank portion.

EDWARD G. SCHMIDT.
FRANCIS J. CANTALUPO.

References Cited in the file of this patent

UNITED STATES PATENTS

| Number | Name | Date |
|---|---|---|
| 332,901 | Hawthorn et al. | Dec. 22, 1885 |
| 1,303,175 | Draper | May 6, 1919 |
| 1,617,451 | Kniskern | Feb. 15, 1927 |
| 2,278,881 | Jacocks | Apr. 7, 1942 |
| 2,281,145 | Duey | Apr. 28, 1942 |
| 2,436,407 | Stephens | Feb. 24, 1948 |
| 2,443,312 | Geiger et al. | June 15, 1948 |
| 2,459,668 | Melichar | Jan. 18, 1949 |
| 2,582,995 | Laurent | Jan. 22, 1952 |
| 2,582,997 | Laurent | Jan. 22, 1952 |